ELECTRICAL INTERLOCK

Filed March 13, 1963

INVENTORS
LOUIS J. DAIGLE
DONALD P. CORNELL
BY David S. Fishman
ATTORNEY 3,270,212
Patented August 30, 1966

3,270,212
ELECTRICAL INTERLOCK

Louis J. Daigle and Donald P. Cornell, Manchester, Conn., assignors to United Aircraft Corporation, East Hartford, Conn., a corporation of Delaware Filed Mar. 13, 1963, Ser. No. 264,966
1 Claim. (Cl. 307—88.5)

This invention relates to an electrical interlock. More particularly, this invention relates to an electrical monitoring system in which normal and undesirable conditions are sensed and in which an alarm is actuated only when the undesirable condition exists.

The invention will be described in connection with tape selectors for digital computers such as the IBM 7090 computer. However, it is to be expressly understood that the inveition is not limited to use with digital computer tape selectors, but rather the invention has general application as an electrical interlock either in conjunction with or as a substitute for mechanical interlocks.

A tape selector for digital computers is a convenient switchboard which enables the operator of the computer to select magnetic tape frames for a particular program. Most programs make use of several tape frames, and the program will identify the tape frames as tape number 1, tape number 2, etc., during the running of the computer. Each tape frame has its own selector panel with a number of mechanically interlocked push buttons, there usually being ten buttons numbered from "0" to "9." The mechanical interlock allows only one push button to be depressed at a time, and the depressed button designates the position assigned to the tape frame during the running of a particular program.

The mechanical interlocking feature prevents a tape frame from being assigned to more than one position in a program, but with several tape frames and several selector panels being used there is no provision for preventing two or more tapes from being assigned to the same position. In other words, the mechanical interlock assures that each tape will only be assigned to one position in the program, but there is no provision for assuring the same position will not be assigned to two or more tapes. If this latter condition were to exist, i.e., the same position being assigned to more than one tape, then information would be written on or read from two or more tapes at the same time, a condition which would obviously result in erroneous calculations by the computer.

The electrical interlock of the present invention supplements the mechanical interlock on the tape selector panels and operates to insure that the same position will not be assigned to more than one tape, thus assuring that information will not inadvertently be written on or read from two or more tapes at the same time. In the invention, each push-button number on all the tape selector panels operates an electrical switch in one of several summation circuits. There is a summation circuit for each push-button number on all the tape selector panels so that one summation circuit will sum up all currents from the number "0" push-button switches, another summation circuit will sum up all currents from the number 1 push-button switches, etc. Thus, all the push-button positions from number "0" to number "9" are fed into a series of summation circuits, there being one such summing circuit for each number on the selector panels.

In any one summing circuit there will be not output if no tapes have been assigned to the position being monitored by that summing circuit, there will be a first predetermined voltage output from the summing circuit if one tape is in that position, and there will be a multiple of that first predetermined output voltage if two or more tapes are in that position. All summation circuit outputs feed an "or" gate, and the output of the "or" gate will be proportional to that from the summation circuit having the largest output. The "or" gate drives a level detector which differentiates or discriminates between the first predetermined voltage output of a summation circuit commensurate with one tape frame being assigned to a particular position and a multiple of that predetermined voltage output commensurate with more than one tape frame being assigned to a particular position. The first predetermined voltage level is recognized as being normal by the level detector, but a multiple of that voltage output is recognized by the level detector as an undesirable dual connection conditon, and the level detector indicates the dual connection by triggering an alarm.

Accordingly, one object of the present invention is to produce a novel electrical interlock system.

Another object of the present invention is to produce a novel electrical interlock system which generates a warning signal when an undesirable condition exists.

Still another object of the present invention is to produce an electrical interlock system in which a large number of possible combinations of conditions are monitored so that an undesirable combination can be avoided.

Still another object of the present invention is a novel electrical interlock system in which a level detector discriminates between normal and undesirable conditions and energizes an alarm when the undesirable condition occurs.

Other objects and advantages will be apparent from the specification and claims, and from the accompanying drawings which illustrate an embodiment of the invention.

Figure 1:
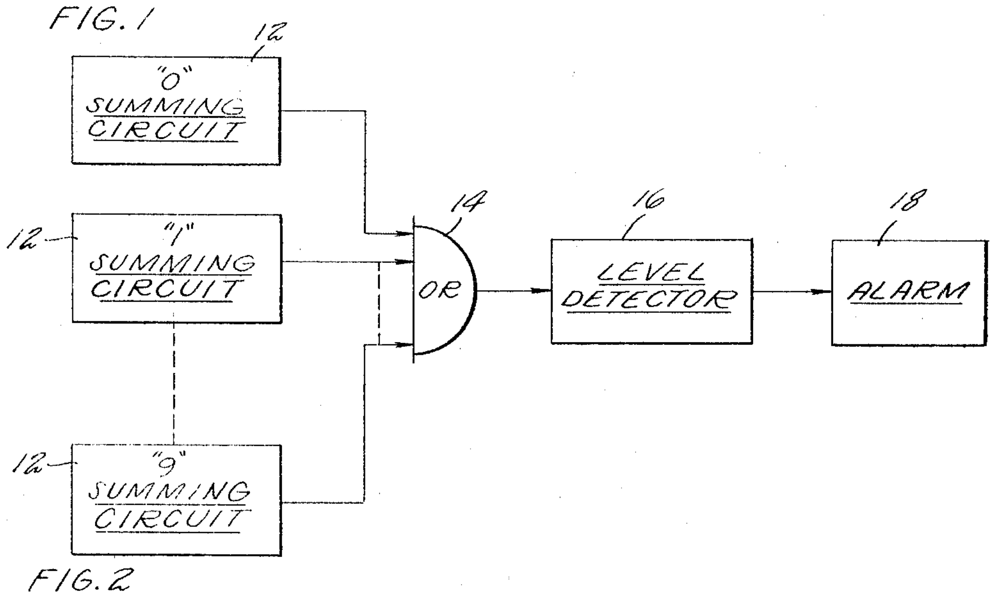
FIG. 1 is a block diagram of the electrical interlock system of the present invention.

Referring now to FIG. 1, there are a plurality of summing circuits 12, the number of summing circuits corresponding to the number of push-button positions on the tape selector panels of a computer and being ten in the present illustration. For the purpose of convenience, only three of the summing circuits are shown in the block diagram. The output of each summing circuit feeds a diode coupled "or" gate 14 in which there is a plurality of diodes or switches corresponding to the number of summing circuits and in which each diode corresponds to and receives the output from a summing circuit. The output from "or" gate 14 feeds level detector 16, and level detector 16 is connected to deliver an actuating signal to alarm circuit 18.

Figure 2:
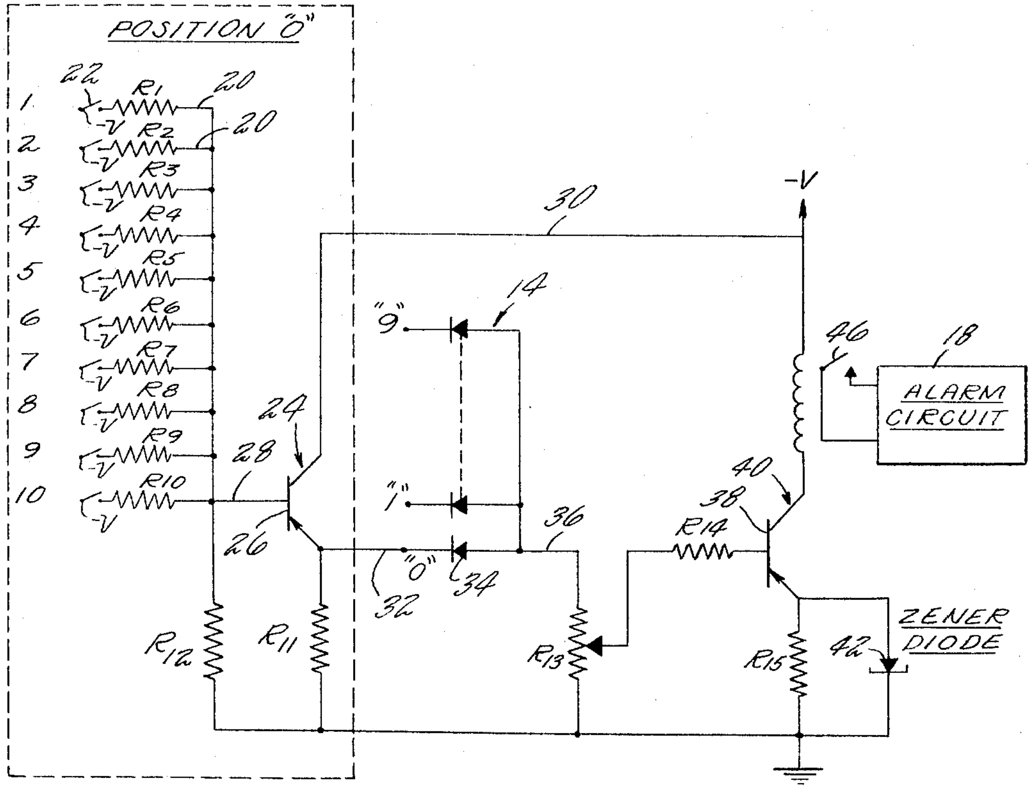
FIG. 2 is a schematic of the block diagram shown in FIG. 1.

Referring now to FIG. 2, the electrical interlock system is shown in schematic form. The summing circuit for position "0" is shown within the dotted lines, and this summing circuit corresponds to the position "0" summing circuit shown in FIG. 1. The summing circuit has a plurality of legs 20, there being one such leg for each tape selector panel, and there is a switch 22 in each leg 20, each switch 22 being connected to and being actuated by a push-button number "0" in a tape selector panel. There is a resistor in each leg, the resistors being labeled $R_1$ through $R_{10}$, and resistors $R_1$ through $R_{10}$ all have the same ohmic rating. The left terminal of each leg 20 is connected to the negative side of a separate source of D.C. potential (not shown), the potentials all being of equal value. The summing circuit also contains an emitter follower PNP transistor 24, and the base 26 of transistor 24 is connected to the common output 28 of legs 20. There is a resistor $R_{11}$ in the emitter circuit of transistor 24, and the collector circuit of transistor 24 is connected via conductor 30 to a source of negative potential —V. Resistor $R_{12}$ is connected in parallel with input line 28 to transistor 24, and both resistors $R_{11}$ and $R_{12}$ are connected at one end to ground.

It is to be understood that there are a plurality of summing circuits, one for each of the positions "0" through "9" on the selector panels, identical to the summing circuit described above and shown in FIG. 2 within the dotted lines. Only one of the summing circuits has been shown in FIG. 2 for the purpose of convenience. The summing circuit for position "0" is connected via conductor 32 to diode or switch 34 which is in and forms part of "or" gate 14. Each of the remaining summing circuits for the remaining positions "1" through "9" on the selector panels are connected to separate diodes or switches similar to diode 34 in "or" gate 14. These remaining diodes in "or" gate 14 and the separate inputs from each of the remaining summing circuits are represented schematically in FIG. 2 by the bank of diodes and the individual input leads "1" and "9." There is a single output 36 from "or" gate 14 which leads through trim resistor $R_{13}$ and current limiting resistor $R_{14}$ to the base 38 of PNP transistor 40. There is a resistor $R_{15}$ in the emitter circuit of transistor 40, and Zener diode 42 is connected across resistor $R_{15}$. The collector circuit of transistor 40 leads through coil 44 to the source of negative potential —V, and coil 44 is coupled in well-known fashion to relay 46 of alarm circuit 18.

In the operation of the invention, all of the switches 22 will be opened and there will be no output from any summing circuit when none of the buttons on the tape selector panels have been depressed. Considering now the position "0" button on the tape selector panels, assume that the "0" button is depressed on tape selector panel 9. The switch 22 which is connected to and actuated by the "0" button on tape selector 9 would be closed, a negative D.C. voltage would be impressed on the left-hand side of resistor $R_9$, and there would be a voltage drop across and a current through resistor $R_9$. If the position "0" button on any other tape selector panel is depressed, for example the position "0" button on tape selector panel 5, the corresponding switch 22 would be closed and a negative voltage signal would be applied to the left-hand side of resistor $R_5$ so that a voltage drop across and a current through resistor $R_5$ would result. The total current flowing through the legs of the summing circuit will be directly proportional to the total number of activated legs in the summing circuit, and the parallel combination of resistor $R_{12}$ and the input impedance to emitter follower 24 will yield a voltage signal on the base 26 of transistor 24 commensurate with or proportional to the sum of all currents in the summation circuit.

Transistor 24 will conduct when a negative voltage is applied to base 26, and current will be drawn through transistor 24 to the source of negative potential —V both from ground through resistor $R_{11}$ and from ground through resistor $R_{13}$ and the diode 34 corresponding to the summing circuit for position "0" in "or" gate 14. Thus, the output of the summing circuit, which may be considered to be either the output from emitter follower 24 or the voltage input signal to base 26, is at a first level when only one of the switches 22 is closed and is at second and higher levels when two or more of the switches 22 are closed.

The output from the summing circuit is passed or fed by diode 34 through current limiting resistor $R_{14}$ to the base 38 of transistor amplifier 40. When the signal passed from diode 34 to transistor amplifier 40 is commensurate with the closing of only one of the switches 22, transistor 40 draws current from ground through resistor $R_{15}$ and then to —V through coil 44. Under this low signal input condition to amplifier 40, the voltage at the emitter is not sufficient to break down Zener diode 42, and the current through coil 44 is not sufficient to actuate relay 46 because amplifier 40 operates at high current feedback and low gain. When the signal passed by diode 34 is commensurate with the closing of two or more of the switches 22, a larger signal is delivered to base 38 and the voltage at the emitter of transistor 40 becomes sufficiently negative to break down the Zener diode. The current gain of amplifier 40 increases to a maximum, and a large current then flows through transistor 40 to coil 44, and this larger current is sufficient to energize relay 46 and set off alarm circuit 18 to signal the occurrence of an undesirable dual connection.

It will be understood that the above-described operation with respect to the summing circuit for position "0" is equally applicable to any of the summing circuits, and these other summing circuits would pass their output signals through the corresponding diodes in "or" gate 14 through transistor amplifier 40. It will also be observed that when the signal passed by any diode 34 becomes higher than the signal being passed by the other diodes, the other diodes will be reversed biased and will cease to conduct. It will also be observed that emitter follower 24 serves to isolate the output of the summing circuit from the source of negative potential —V.

It is to be understood that the invention is not limited to the specific embodiment herein illustrated and described, but may be used in other ways without departure from its spirit as defined by the following claim.

We claim:

An electrical monitoring circuit for a system having a plurality of input signals, said circuit being responsive to the presence of more than a predetermined number of input signals, comprising a plurality of summing networks, each summing network having a plurality of input circuits, each said input circuit comprising a source of D.C. voltage, a switch and a resistor connected in series whereby an input signal of substantially equal amplitude is produced by each input circuit only when said switch is closed, means including an emitter follower connected to the output of each summing network for combining the input signals from the input circuits of each said summing network to produce an output signal whereby each said summing network produces an output signal having an amplitude proportional to the number of input circuits in the respective summing network whose switches are closed, an OR circuit having a plurality of inputs, the output signal from each said emitter follower being connected to one of said OR circuit inputs, said OR circuit having a diode for each of said summing networks, said diodes being poled whereby only the output signal having the greatest magnitude is passed through said OR circuit to the output thereof, an amplifier including an electronic discharge device having input, output and reference terminals, an indicator connected to the output terminal of said electronic discharge device, means connecting the output from said OR circuit to the input terminal of said electronic discharge device, and a Zener diode connected to the reference terminal of said electronic discharge device to provide a reference voltage for said electronic discharge device, said electronic discharge device producing an output signal sufficient to actuate said indicator only when the amplitude of the output signal passed by said OR circuit is indicative of the closing or more than a predetermined number of switches in the input circuits of one of said summing networks.

References Cited by the Examiner

UNITED STATES PATENTS

| | | | |
|---|---|---|---|
| 2,712,065 | 6/1955 | Elbourn et al. | 307—88.5 |
| 2,950,461 | 8/1960 | Tyron | 307—88.5 |
| 3,099,000 | 7/1963 | Dunning | 340—248 |
| 3,099,001 | 7/1963 | Syptak | 328—148 |

OTHER REFERENCES

IBM Technical Disclosure Bulletin, "Combining Logical Circuits," by Buelow et al., vol. 2, page 48, August 1959.

Design by Transistorized Circuits for Digital Computers, by Pressman, John F. Rider Inc., New York, March 1959, pages 6–118, 8–191, 10–273.

Radio Electronics, "Transistor Pack Powers Model Railroad," by Lederer, February 1961, page 40.

ARTHUR GAUSS, *Primary Examiner.*

B. P. DAVIS, *Assistant Examiner.*